UNITED STATES PATENT OFFICE.

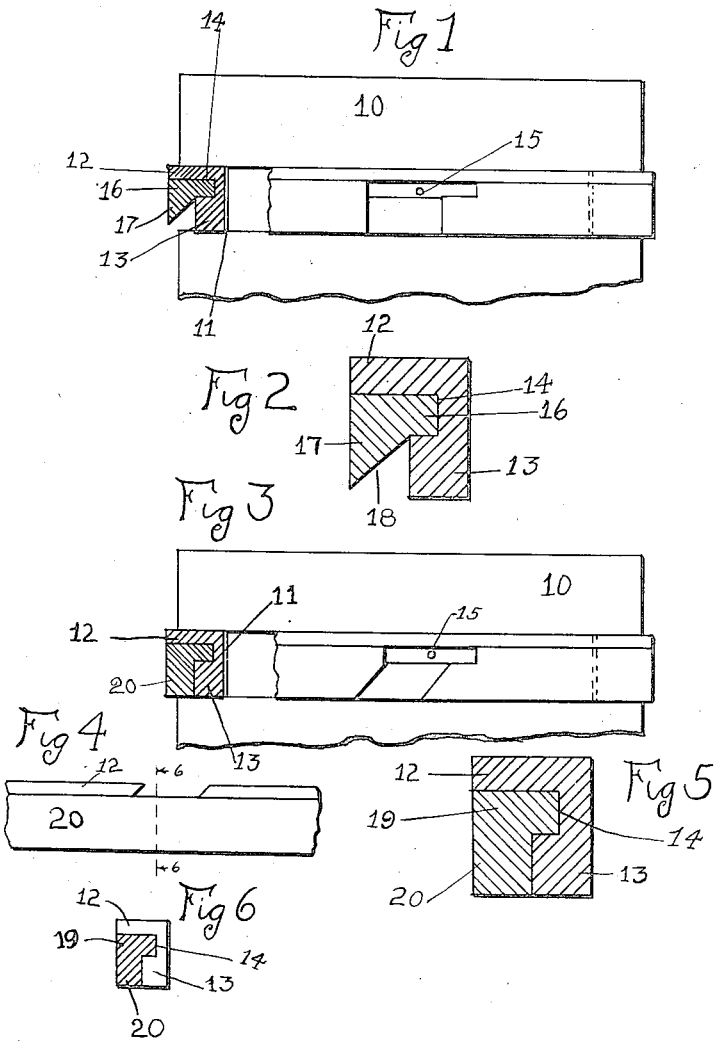

DAVID S. ANTHONY, OF LAMONI, IOWA, ASSIGNOR OF ONE-HALF TO EDWARD HOOPER, OF SAN ANTONIO, TEXAS.

PISTON RING.

1,410,727.     Specification of Letters Patent.    Patented Mar. 28, 1922.

Application filed January 7, 1919. Serial No. 270,031.

*To all whom it may concern:*

Be it known that I, DAVID S. ANTHONY, a citizen of the United States, and a resident of Lamoni, in the county of Decatur and State of Iowa, have invented a certain new and useful Piston Ring, of which the following is a specification.

The object of my invention is to provide a two-part piston ring of simple, durable and inexpensive construction so constructed and arranged as to accomplish a variety of desired functions.

One of the objects of my invention is to provide a two-part piston ring with the parts so connected together as to afford mechanism to prevent the leakage of gas past the ring.

Another object is to provide in such a piston ring of the general type mentioned, a construction whereby a maximum of oil will be collected and moved toward the crank case.

Still a further object is to provide a two-part piston ring having the parts so constructed and arranged that they are automatically locked together and held against movement with relation to each other longitudinally of the piston, and whereby they will be held locked together during the assembling of the ring on the piston.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of an end of a piston with one of my piston rings installed thereon; the piston ring being shown at one point in cross section.

Figure 2 shows an enlarged, sectional view of the piston ring.

Figure 3 shows a similar view to that shown in Figure 1, on a slightly modified form of my ring.

Figure 4 shows a side elevation of the opposite side of the piston ring from that shown in Figure 3.

Figure 5 shows an enlarged sectional view of the piston ring shown in Figure 3; and Figure 6 shows a sectional view of the ring shown in Figure 3 taken on the line 6—6 of Figure 4.

In the accompanying drawings, in Figure 1, I have shown a piston indicated generally by the reference character 10. The piston 10 has the piston ring groove 11 in which my improved piston ring is mounted.

My improved piston ring comprises two split ring members, the first of said members comprising an annular ring member 12, shown in Figure 10, which extends into the groove 11 and has at its lower end a lateral extension 13.

In the outer surface of the lateral extension 13 adjacent to the annular ring member 12 is an annular groove 14. The extension 13 is provided in the groove 14 with a pin 15, shown in Figure 1.

The second of the ring members comprises an annular split ring member 16, the inner edge of which is received in the groove 14 as illustrated in Figures 1 and 2.

Formed on the outer portion of the ring member 16 is a lateral extension 17, wedge-shaped in cross section and having a bevelled edge 18 opposite the extension 13 as illustrated particularly in Figure 2.

The wedge-shaped extension 17 terminates in a relatively sharp edge just short of flush with the lower face of the extension 13 as the parts are shown in Figure 2.

In Figures 3 to 6 inclusive I have shown a slightly modified form of my invention.

The piston shown in these figures is indicated by the reference numeral 10 and is the same as the piston shown in Figure 1, and provided with a similar groove 11.

The piston ring, of the form shown in Figures 3 to 6 inclusive, has one ring member which is the same as the first ring member described above and illustrated in Figures 1 and 2. The ring member just mentioned has the members 12 and 13 with the groove 14, and has also the pin 15 in the groove. The second ring member of the modified form consists of an annular split ring member 19 similar in shape and construction to the ring member 16 above described.

The ring member 19, however, has a lateral extension 20, as shown in Figure 5, so that the second ring member of the modified form is substantially L-shaped in cross section.

The lower surface of the extension 20 is flush with the lower surface of the extension 13, and the outer surface of the extension 20 is flush with the outer surface of the ring member 12.

When my improved piston ring is assembled and installed on the piston, the member 12 is arranged toward the compression end of the cylinder and the member 13 toward the crank case end of the cylinder.

It will be noted that on account of the fact that the members 16 and 19 respectively fit into the grooves 14, the two members of the piston ring are thus locked and held together by their resiliency against any relative movement longitudinally of the piston.

This feature I consider of especial importance on account of the fact that when the rings are assembled on the piston, and the piston is inserted into the cylinder from the lower end thereof, there is always some difficulty in compressing the rings so as to slip them into the cylinder. If it were not for the fact that the members 16 and 19 were received in the groove 14, it would frequently occur that the outer piston ring member would slip off the inner piston ring member during the insertion of the rings into the cylinder, and break the ring member, and the work would have to be done a second time.

On the other hand with the construction shown herein, there is no danger of the outer piston ring member slipping downwardly on the piston when the piston with the ring thereon is being inserted into the cylinder.

It will be noted that by mounting the outer ring member on the inner ring member at such a point that the pin 15 is at the break in the outer ring member, said pin will limit any rotary movement of the ring members with relation to each other, and hence will prevent the breaks in the two ring members from ever reaching a point where they register with each other, and thereby prevent leakage past the piston ring.

In the form of the device shown in Figure 1, attention is called to the sharp edge of the extension and to its relation to the sharp edge of the extension 13, whereby there is provided a scraper edge and adjacent thereto an annular pocket.

As the piston moves downwardly, the scraper edge will scrape the excess oil from the cylinder wall and collect same in the annular pocket and convey the oil to the lower end of the cylinder, where it will be discharged as soon as the piston commences its upward movement.

On account of this construction a minimum of oil from the crank case will get into the combustion chambers.

In the form of the device shown in Figure 3, applicant desires to call attention to one important feature of the construction.

The rings should be placed on the piston with the member 12 upwardly. This is important for the construction herein shown is such that when the rings are so placed on the piston there will be a minimum of leakage of gas downwardly past the piston rings. It will be obvious that there is likely to be a little space between the inner surface of the piston ring and the bottom of the groove 11. The piston rings also do not fit tightly against the sides of said groove. Some gas will creep past the upper surface of the ring member 12 into the groove 11. However, pressure of the gas on the piston ring may tend to hold the lower surface of the piston ring members snugly against the lower wall of the groove 11.

It will be noted that with the structure shown herein, there will be a ring member pressing downwardly against the lower wall of the groove 11 at all points in the circumference of the piston ring.

It is believed that no two-part piston ring has a structure where this is possible.

On account of the fact that there is thus a ring surface engaging the lower wall of the groove at all points in the circumference of the ring, and on account of the downward pressure on the ring from the gases, it will be seen that there will be very little likelihood of any substantial escape of gases downwardly past the piston ring.

It will be clear that the piston ring must be arranged, as hereinbefore described, with the member 12 upward. If the piston ring were placed on the piston with the other side toward the combustion chamber, there would be a space open between the ends of the member 13, shown in Figure 4, where gases could readily escape from the bottom of the groove outwardly along the lower wall thereof.

The advantages of my improved piston ring are largely obvious from the foregoing description.

By using two members it is obvious that if one should become stuck the other would not necessarily become similarly stuck and hence there are two extension members instead of one to prevent the escape of gases downwardly along side the piston.

The way the two piston rings are put together, prevents their separation while the piston with the rings thereon is being inserted into the cylinder.

The arrangement of the oil scraper device has important advantages in this combination.

The arrangement of the ring member, as shown in Figure 3, on the piston with the member 12 upwardly, and with a continuous ring member surface engaging the lower wall of the groove 11 for thereby preventing the escape of gases, is thought to be new in a two-part piston ring.

Some changes may be made in the construction and arrangement of the various parts of my improved ring without departing from the essential spirit and purposes of my invention, and it is my intention to cover by my present claim any modified forms of structure or use of mechanical equivalents which may be reasonably included within their scope.

I claim as my invention:

An improved piston ring, comprising an inner split ring member having its inner surface shaped to enter a piston ring groove in a piston, and also having part of its outer surface designed to engage the interior of a cylinder, and another part of its outer surface designed to stand spaced apart from the cylinder, there being between said parts of the outer surface an annular groove, a second or outer split piston ring member having on its inner surface an annular rib shaped to enter the annular groove in the inner piston ring member, and also having its outer surface designed to engage a cylinder, and also having a part extended over to the outer part of the inner piston ring member which stands spaced from the cylinder, the said split portions of the two piston ring members being arranged out of alinement with each other, and means for preventing circumferential movement of one piston ring member relative to the other.

Des Moines, Iowa. September 19, 1918.

DAVID S. ANTHONY.